United States Patent [19]
Hewitt

[11] Patent Number: 5,964,292
[45] Date of Patent: Oct. 12, 1999

[54] GROUTING APPLICATION OF THE ANNULAS SEAL SYSTEM FOR WELL CASINGS

[76] Inventor: Rex L. Hewitt, 4885 Rhett Rd., Rogersville, Mo. 65742

[21] Appl. No.: 08/992,989

[22] Filed: Dec. 18, 1997

[51] Int. Cl.⁶ .................................................. E21B 33/14
[52] U.S. Cl. ........................................... 166/292; 166/294
[58] Field of Search ..................... 166/292, 294, 166/281, 902; 405/128

[56] References Cited

U.S. PATENT DOCUMENTS

| | | | |
|---|---|---|---|
| 4,936,386 | 6/1990 | Colangelo | 166/292 |
| 5,271,469 | 12/1993 | Brooks et al. | 166/387 |
| 5,309,994 | 5/1994 | Douglas et al. | 166/278 |
| 5,389,146 | 2/1995 | Liao | 166/292 X |
| 5,476,142 | 12/1995 | Kajita | 166/294 |

*Primary Examiner*—Frank Tsay
*Attorney, Agent, or Firm*—Hovey, Williams, Timmons & Collins

[57] ABSTRACT

A grouting system for well casings (26) uses a grout wrap (10) including first (12) and second (14) flexible sheets with a layer (16) of flexible, hydrophilic grout material therebetween that expands upon absorption of water. In the preferred embodiment, each well casing section (30a,b) is enclosed by the preferred grout wrap (10) before placement in the well hole (28). After placement, the grout material is exposed to water for absorption so that the grout material expands and seals the casing.

22 Claims, 1 Drawing Sheet

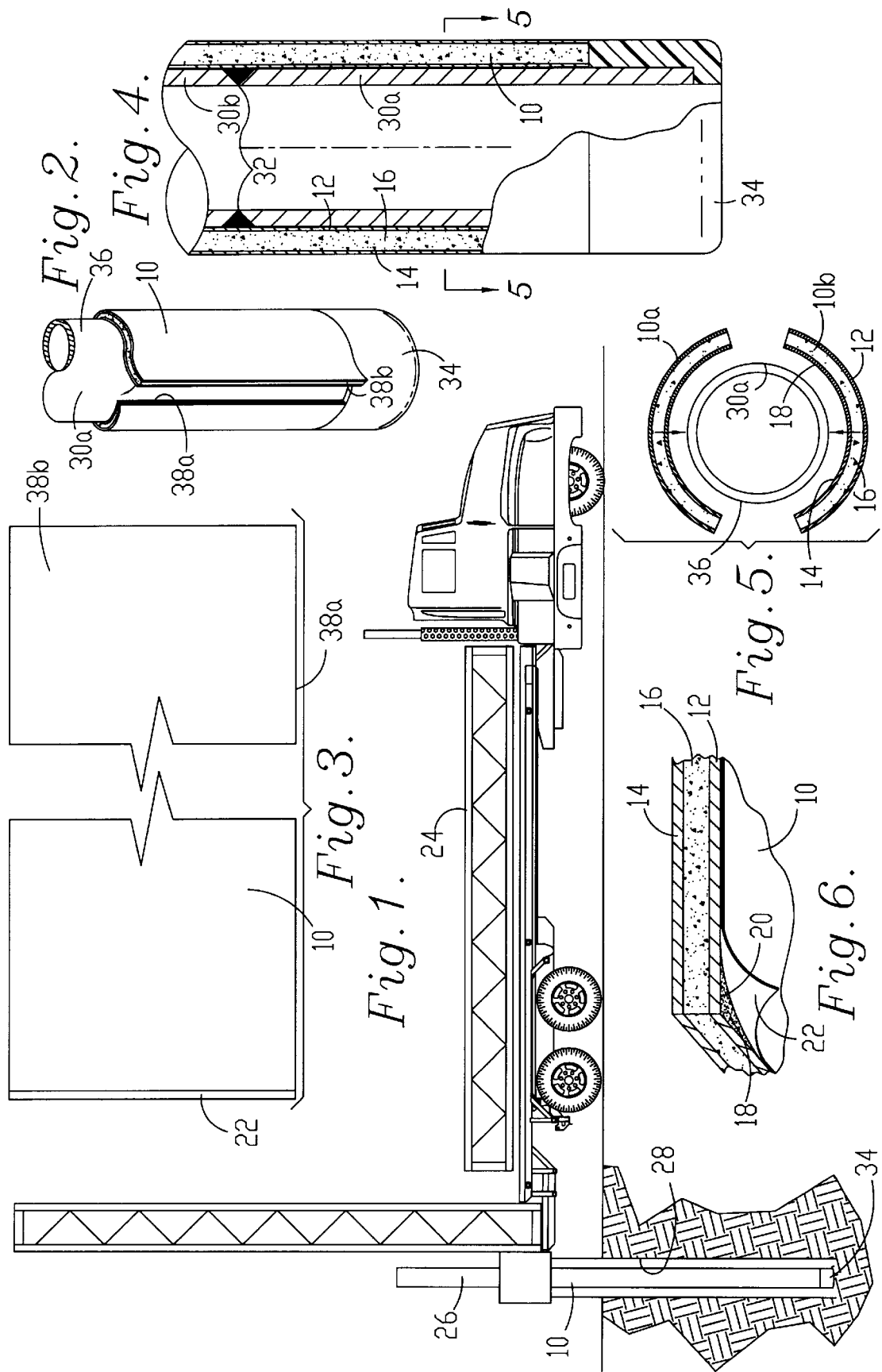

GROUTING APPLICATION OF THE ANNULAS SEAL SYSTEM FOR WELL CASINGS

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention is concerned with the field of grouting application of well casings. In particular, the invention is concerned with a grout wrap including first and second flexible sheets with a layer of flexible, hydrophilic grout material therebetween that expands upon absorption of water. In the preferred embodiment, each well casing section is enclosed by the preferred grout wrap before placement in the well hole, for the purpose of annulas seal between the exterior of well casing and drill hole. After placement, the grout material is exposed to water for absorption so that the grout material expands and seals the annulas space to prevent vertical or lateral movement of surface contamination.

2. Description of the Prior Art

In the prior art of water wells, successive, series connected, well casing sections are lowered into a drill hole approximately 2" larger than casing. For a typical residential well, concrete is then poured into the annulas space between the casing and the walls of the hole. The purpose of the concrete is to seal the exterior of the casing in order to prevent surface contamination into the ground water. This technique is not always successful, however, because the concrete may flow around protrusions from the wall of the hole. As a result, the casing is not sealed in the vicinity of these protrusions.

Another sealing technique, typically used for public wells, is to pump concrete through the interior of the casing so the concrete flows through the casing and then up again along the exterior of the casing. The pumping continues until concrete emerges from this space at the top of the hole. Percussion drilling is then used to clear the concrete from the interior of the casing. However, protrusions between the walls of the hole and the exterior of the casing can still result in voids in the concrete seal thereby exposing a conduit path for the penetration of surface to ground water pollution. It will also be appreciated that these prior art techniques are expensive and the scheduling for sub-contracting times are difficult.

SUMMARY OF THE INVENTION

The present invention solves the prior art problems discussed and provides a distinct advance in the state of the art. In particular, the well casing grout application hereof ensures in an economical manner that the well casing exterior is sealed before lowering into the well hole.

The preferred well casing grout application of the present invention uses a grout wrap having first and second flexible sheets with a layer of flexible, hydrophilic grout material therebetween that expands upon absorption of water. In the preferred method, each well casing section is enclosed by the preferred grout wrap before placement in the well hole with the grout wrap lapping joints between well casing sections. After placement of the sections in the well hole, the grout material is exposed to water for absorption so that the grout material expands and seals the annulas space.

Due to the adhesive seal of grout wrap application, it has the capability of 100% positive displacement into a determined depth even through protrusions and unconsolidated formations, cave openings or bridged over particles. Grout wrap application can even be installed under pressure or driven into desired depth. Other preferred aspects of the present invention are disclosed herein.

BRIEF DESCRIPTION OF THE DRAWINGS

FIG. 1 is a side elevational view of a well rig lowering well casing sections into a well hole with the sections enclosed by the preferred well casing grout wrap of the present invention;

FIG. 2 is a pictorial view of a portion of a well casing being enclosed by the well casing grout wrap of the present invention;

FIG. 3 is a top plan view of the preferred well casing grout wrap before installation;

FIG. 4 is a partial sectional view of adjacent well casing sections with the preferred well casing grout wrap applied thereto;

FIG. 5 is a sectional view taken along line 5—5 of FIG. 4; and

FIG. 6 is a partial pictorial view of the preferred grout wrap showing a portion of the released liner detached therefrom.

DETAILED DESCRIPTION OF THE PREFERRED EMBODIMENT

The drawing figures illustrate the preferred well casing grout wrap 10 and the method of use thereof of the present invention. FIGS. 3 and 6 illustrate wrap 10 before installation. As shown, wrap 10 includes inboard sheet 12, outboard sheet 14, grout layer 16 between sheets 12 and 14, coating 18 of pressure sensitive adhesive applied to exterior face 20 of inboard sheet 12, and release liner 22 positioned over coating 18.

Sheets 12,14 and liner 22 are preferably composed of flexible, synthetic resin film but conventional paper stock could also be used along with other equivalent sheet materials. Grout layer 16 is composed of hydrophilic grout material that expands upon absorption of water. The preferred grout material is bentonite particles formed into layer 16 using a conventional, water soluble, flexible, binding agent. Wrap 10 is preferably about one half inch thick and about five feet long. The width is equal to about the circumference of the well casing to be enclosed for smaller diameter casings, and about half the circumference for use with larger diameter well casings.

FIG. 1 illustrates well rig 24 in the process of lowering well casing 26, enclosed by a plurality of wraps 10, into well hole 28. Casing 26 is composed of a plurality of series connected, well casing sections such as sections 30a and 30b illustrated in FIG. 4, for example. As is conventional for water wells, each section is about twenty-one feet long and beveled at the ends for filet welding adjacent sections forming a joint such as joint 32 therebetween. As illustrated in FIGS. 2 and 4, the initial (lowermost) section 30a includes drive shoe 34 mounted over the lower end thereof.

In the preferred method, each well casing section is enclosed by grout wraps 10 before lowering into well hole 28. FIG. 2 illustrates the installation of the initial grout wrap 10 onto casing section 30a adjacent drive shoe 34. For smaller diameter well casings such as those with a three inch interior diameter, the circumference is about 11⅜" which is the preferred width of wrap 20 for this size of casing.

To install, release liner 22 is removed from exterior face 20 of inboard sheet 12. Wrap 10 is then placed around casing section 30a adjacent drive shoe 34 with adhesive coating 18 in contact with exterior surface 36 of section 30a. Opposed side edges 38a and 38b of wrap 10 abut one another upon completion of the installation. Successive wraps 10 are installed one above the other along the length of the well casing section. With each wrap 10 being about five feet long, four lengths enclose twenty feet of the section. For the first well casing section, the next wrap encloses the remaining one foot portion and three feet of the next casing section. In this way, wrap 10 laps the joint between sections.

FIGS. 4 and 5 illustrate the use of two grout wraps such as wraps 10a and 10b for larger diameter casings. For example, a five inch casing presents a circumference of about 17¹¹⁄₁₆". For this application, wraps 10a and 10b each present a width of about half of this circumference so that each encloses about half the periphery of the well casing section with respective side edges abutting.

It will be noted that the outer diameter of well casing 26 with wraps 10 applied thereto is about the same as the external diameter of drive shoe 34. As well casing 26 is lowered into well hole 28, drive shoe 34 clears any obstructions or protrusions from the walls of well hole 28 and prevents damage to wraps 10. Also, outboard sheet 14 protects grout layer 16 during the placement of well casing 26.

After installation, grout wraps 10 are exposed to water. This occurs naturally at the lower end of well hole 28 and is supplemented by additional water pumped into well hole 28. Grout layer 16 absorbs the water and expands typically by about 25%. In so doing, the joints between the edges of wraps 10 are sealed and wraps 10 also expand snugly against the walls of well hole 28. Thus, wraps 10 completely seal the exterior surface 36 of well casing 26. This ensures a long service life for casing 26 and ensures that water drawn from well casing 26 remains uncontaminated.

Those skilled in the art will appreciate that the present invention encompasses many variations in the preferred embodiment described herein. For example, the invention hereof presents utility with other types of wells such as oil wells and natural gas wells which typically use threaded joints. Also, materials other than the preferred bentonite can also be used as the grout layer.

Having thus described the preferred embodiment of the present invention, the following is claimed as new and desired to be secured by Letters Patent:

1. A well casing grout wrap comprising:
   a flexible first sheet;
   a flexible second sheet; and
   a flexible grout layer between said sheets composed of hydrophilic grout material that expands upon absorption of water,
   said sheets and grout layer being sized for wrapping at least a portion of the exterior of a well casing.

2. The wrap as set forth in claim 1 further including coupling means for coupling with the exterior of a well casing.

3. The wrap as set forth in claim 2, said first sheet including an exposed face, said coupling means including a coating of adhesive on said exposed face for adhering said first sheet and thereby said wrap to the exterior of a well casing.

4. The wrap as set forth in claim 3, said adhesive including a pressure sensitive adhesive, said wrap further including a removable release liner covering said adhesive.

5. The wrap as set forth in claim 1 presenting opposed side edges presenting a distance therebetween substantially equal to the circumference of a well casing so that said wrap covers the periphery of the casing and so that said side edges abut one another.

6. The wrap as set forth in claim 1 presenting opposed side edges presenting a distance therebetween equal to about one half the circumference of a well casing so that said wrap covers about one half the periphery of the casing, thereby enabling the placement of another of said wrap about the remainder of the periphery of the casing.

7. The wrap as set forth in claim 1, said grout material including bentonite.

8. The wrap as set forth in claim 1, said first sheet including an exposed face, said wrap further including a coating of pressure sensitive adhesive on said exposed face for adhering said first sheet and thereby said wrap to the exterior of a well casing and including a removable release liner covering said adhesive, said grout material including bentonite.

9. In combination:
   a well casing having a periphery presenting a circumference; and
   a well casing grout wrap wrapping at least a portion of said periphery, said grout wrap including
      a flexible first sheet,
      a flexible second sheet, and
      a flexible grout layer between said sheets composed of hydrophilic grout material that expands upon absorption of water.

10. The combination as set forth in claim 9, said wrap further including coupling means for coupling with the exterior of said well casing.

11. The combination as set forth in claim 10, said first sheet including an exposed face, said coupling means including a coating of adhesive on said exposed face for adhering said first sheet and thereby said wrap to said well casing.

12. The combination as set forth in claim 9, said wrap presenting opposed side edges presenting a distance therebetween substantially equal to the circumference of a well casing so that said wrap covers the periphery of said casing and so that said side edges abut one another.

13. The combination as set forth in claim 9, said wrap presenting opposed side edges presenting a distance therebetween equal to about one half the circumference of a well casing so that said wrap covers about one half the periphery of the casing, thereby enabling the placement of another of said wrap about the remainder of the periphery of the casing.

14. The combination as set forth in claim 9, said grout material including bentonite.

15. The combination as set forth in claim 9, said first sheet including an exposed face, said wrap further including a coating of pressure sensitive adhesive on said exposed face for adhering said first sheet and thereby said wrap to the exterior of said well casing, said grout material including bentonite.

16. A well casing grouting method comprising the steps of:
   (a) placing a plurality of series-connected, well casing sections into a well hole;

(b) prior to placing each of said sections into the hole, enclosing the periphery of each of said sections with at least one grout wrap including
   a flexible first sheet,
   a flexible second sheet, and
   a flexible grout layer between said sheets composed of hydrophilic grout material that expands upon absorption of water,
   said sheets and grout layer being sized for wrapping at least a portion of said periphery; and
(c) after placing said sections and grout wrap into the well hole, exposing said grout material to water for absorption thereof so that said grout material expands in order to seal said sections with said grout material.

17. The method as set forth in claim 16, step (b) further including the step of adhering said first sheet and thereby said wrap to said periphery.

18. The method as set forth in claim 16, said wrap presenting opposed side edges presenting a distance therebetween substantially equal to the circumference of a well casing, step (b) further including the step of wrapping said periphery so that said side edges abut one another.

19. The method as set forth in claim 16, said wrap presenting opposed side edges presenting a distance therebetween equal to about one half the circumference of said well casing, step (b) including the step of wrapping said periphery so that said wrap covers about one half the periphery of the casing and placing another of said wraps about the remainder of the periphery of the casing.

20. The method as set forth in claim 16, step (b) including the step of using bentonite as said grout material.

21. The method as set forth in claim 16, adjacent ones of said sections presenting a joint therebetween, step (b) including the step of enclosing said periphery so that said grout wrap laps said joint.

22. The method as set forth in claim 16, step (a) including the step of installing a drive shoe on the lowermost end of the first well casing section with said drive shoe presenting about the same external diameter as said grout wrap.

* * * * *